United States Patent [19]

Huang

[11] Patent Number: 6,033,109
[45] Date of Patent: Mar. 7, 2000

[54] DEVICE FOR CALIBRATING THERMISTOR VOLTAGES TO TEMPERATURE VALUES BY USING ROUGH AND FINE LOOKUP TABLES

[75] Inventor: Te-Hsun Huang, Chu-Pei, Taiwan

[73] Assignee: Winbond Electronics Corp., Taiwan

[21] Appl. No.: 09/080,302

[22] Filed: May 18, 1998

[30] Foreign Application Priority Data

Feb. 12, 1998 [TW] Taiwan .................................. 87101961

[51] Int. Cl.[7] ..................................................... G01K 7/25
[52] U.S. Cl. ............................................................ 374/183
[58] Field of Search ............................. 374/183; 702/130

[56] References Cited

FOREIGN PATENT DOCUMENTS 0214824  12/1983  Japan ...................................... 374/183

OTHER PUBLICATIONS

DiRocco et al., "Mate low–level thermocouples to uCs easily with a flying capacitor multiplexer," Electronic Design, vol. 28, No. 6 (Mar. 1980), pp. 283–285.

*Primary Examiner*—G. Bradley Bennett
*Assistant Examiner*—Stanley J. Pruchnic, Jr.

*Attorney, Agent, or Firm*—Birch, Stewart, Kolasch & Birch, LLP

[57] ABSTRACT

A device appropriate for converting voltages to temperature values by using a thermistor is disclosed. The device according to the present invention utilizes a voltage-temperature cross-reference table and a temperature-increment table to carry out the conversion instead of using the conventional one-to-one voltage-temperature table, thereby reducing the required capacity of RAM and ROM and the fabrication cost. The thermistor is disposed at the place where the temperature is to be measured, and the voltage across the thermistor varies with respect to changes of temperature. An analog-to-digital converter receives the voltage of the thermistor and transforms it into digital output. A first multiplexer decodes the higher bit portion of the digital output thereby selecting a corresponding temperature from a voltage-temperature cross-reference table as a rough temperature. A second multiplexer decodes the higher bit portion of the digital output thereby selecting a corresponding temperature increment from a temperature-increment table as a temperature step. A multiplier multiplies the lower bit portion of the digit output by the temperature step to obtain a fine temperature. An adder adds the fine temperature to the rough temperature to output a practical temperature value.

10 Claims, 2 Drawing Sheets

DEVICE FOR CALIBRATING THERMISTOR VOLTAGES TO TEMPERATURE VALUES BY USING ROUGH AND FINE LOOKUP TABLES

BACKGROUND OF THE INVENTION

1. Field of the Invention

The present invention relates in general to a voltage-to-temperature value conversion device, more particularly, to a device for converting voltages to temperature values by using a thermistor.

2. Description of the Related Art

In general, thermistors are applied to measure the ambient temperature of electronic apparatus, such as the temperature of the motherboard, CPU, and charging battery etc. In general, the temperature specifications of thermistors are within the range between about −40° C. and +120° C., and the resistance of a thermistor decreases as the temperature increases. The general applications of electronic devices, such as the temperature-control of a refrigerator etc., also use thermistors to measure and control temperature. The thermistor is disposed in electronic apparatus where temperature is to be measured. As the temperature varies, the voltage drop across the thermistor changes to a corresponding value. After taking the voltage, the practical temperature can be obtained by referencing the voltage(resistance)-temperature characteristic curve of the thermistor.

The voltage-temperature characteristic curve of a thermistor is a logarithm-like curve, as depicted in FIG. 2. To fit the curve, a lot of voltage value and temperature value sampling pairs are required. The voltage-temperature characteristic curve of the thermistor is transformed into a voltage-temperature cross-reference table such that the voltage measured from the thermistor can be easily transformed into a corresponding temperature. However, the conventional voltage-temperature cross-reference table is implemented in a one-to-one manner by storing every one of the voltage values and every corresponding temperature value sampled from the voltage-temperature curve into a memory device, such as RAM and ROM. Consequently, the amount of memory required and the fabrication cost are increased.

SUMMARY OF THE INVENTION

Therefore, an object of the present invention is to provide a device for converting voltage to temperature by using a thermistor. The present invention does not use the conventional voltage-temperature characteristic curve to carry out voltage-temperature conversion, thereby reducing the required capacity of RAM or ROM and the cost.

The present invention achieves the above-indicated objects by providing a device for converting voltages to temperatures comprising the following units.

A thermistor and a division resistor are connected in series, wherein one terminal of the thermistor is grounded, and one terminal of the division resistor is connected to a voltage source, and the thermistor is disposed at the place where the temperature is to be measured, and the voltage across the thermistor varies with respect to changes of temperature.

An analog-to-digital converter receives the voltage of the thermistor and transforms it into a digital output.

A first multiplexer decodes the higher bit portion of the digital output, thereby selecting a corresponding temperature from a voltage-temperature cross-reference table as a rough temperature.

A second multiplexer decodes the higher bit portion of the digital output, thereby selecting a corresponding temperature increment from a temperature-increment table as a temperature step. A multiplier multiplies the lower bit portion of the digit output by the temperature step to obtain a fine temperature. An adder adds the fine temperature to the rough temperature to output a practical temperature.

The voltage-temperature cross-reference table is set and stored in the first storage device, and the temperature-increment table is set and stored in the second storage device.

In the present invention, the voltage-temperature cross-reference table and the temperature-increment table are used for constructing a voltage-temperature characteristic curve by means of interpolation such that the voltage drop across the thermistor can be transformed into proper temperature in reference of the constructed voltage-temperature characteristic curve. Moreover, the required memory for storing the voltage-temperature cross-reference table and the temperature-increment table is smaller than that required to store the conventional voltage-temperature cross-reference table.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
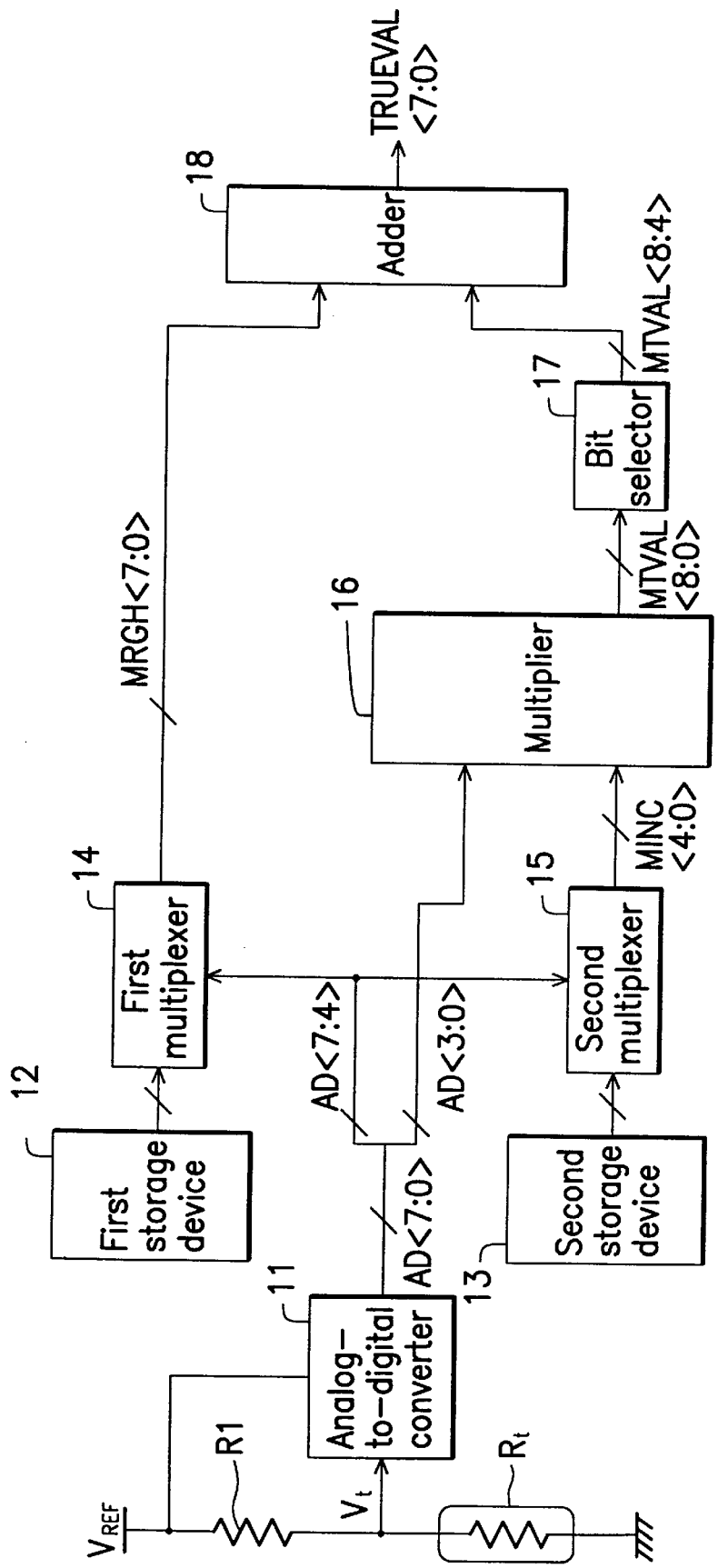
FIG. 1 schematically shows the circuit diagram of the voltage-temperature converting device according to the present invention.

The device for converting voltage to temperature according to the present invention is schematically shown in FIG. 1. In FIG. 1, a division resistor R1 and a thermistor Rt are connected in series, and disposed between a reference voltage source Vref and ground. In general, the thermistor is disposed in the place where the temperature is to be measured. As the temperature varies, the voltage Vt of the thermistor Rt changes correspondingly. The voltage Vt outputs to an analog-to-digital converter 11. In this embodiment, a 8-bit analog-to-digital converter is adopted, wherein the 8-bit digital output value of the converter 11 is represented as AD<7:0>, and AD<7:4> means the higher bit portion of the digital output AD<7:0>, while AD<3:0> means the lower bit portion of the digital output AD<7:0>.

The way to establish the voltage-temperature cross-reference table and the temperature-increment table in accordance with the present invention is described as follows in accompaniment with FIG. 2. In the voltage-temperature characteristic curve of the thermistor Rt, a plurality of node voltages $V_0$, $V_1$~$V_{15}$ are selected to divide the voltage coordinate into several segments, and the node voltages $V_0$, $V_1$~$V_{15}$ have their corresponding temperature values $T_0$, $T_1$~$T_{15}$ respectively at the temperature coordinates. The values (0h, 1h, 2h~Fh) of the higher bit portion AD<7:4> of the digital output AD<7:0>, correspond to the node voltages $V_{15}$, $V_{14}$, $V_{13}$~$V_0$ respectively, and therefore the temperatures $T_0$, $T_1$~$T_{15}$ serve as rough temperatures converted from the higher bit portion AD<7:4>. The 8-bit temperature values $T_0$, $T_1$~$T_{15}$ are stored in a first storage device 12, thereby forming a voltage-temperature cross-reference table.

Figure 2:
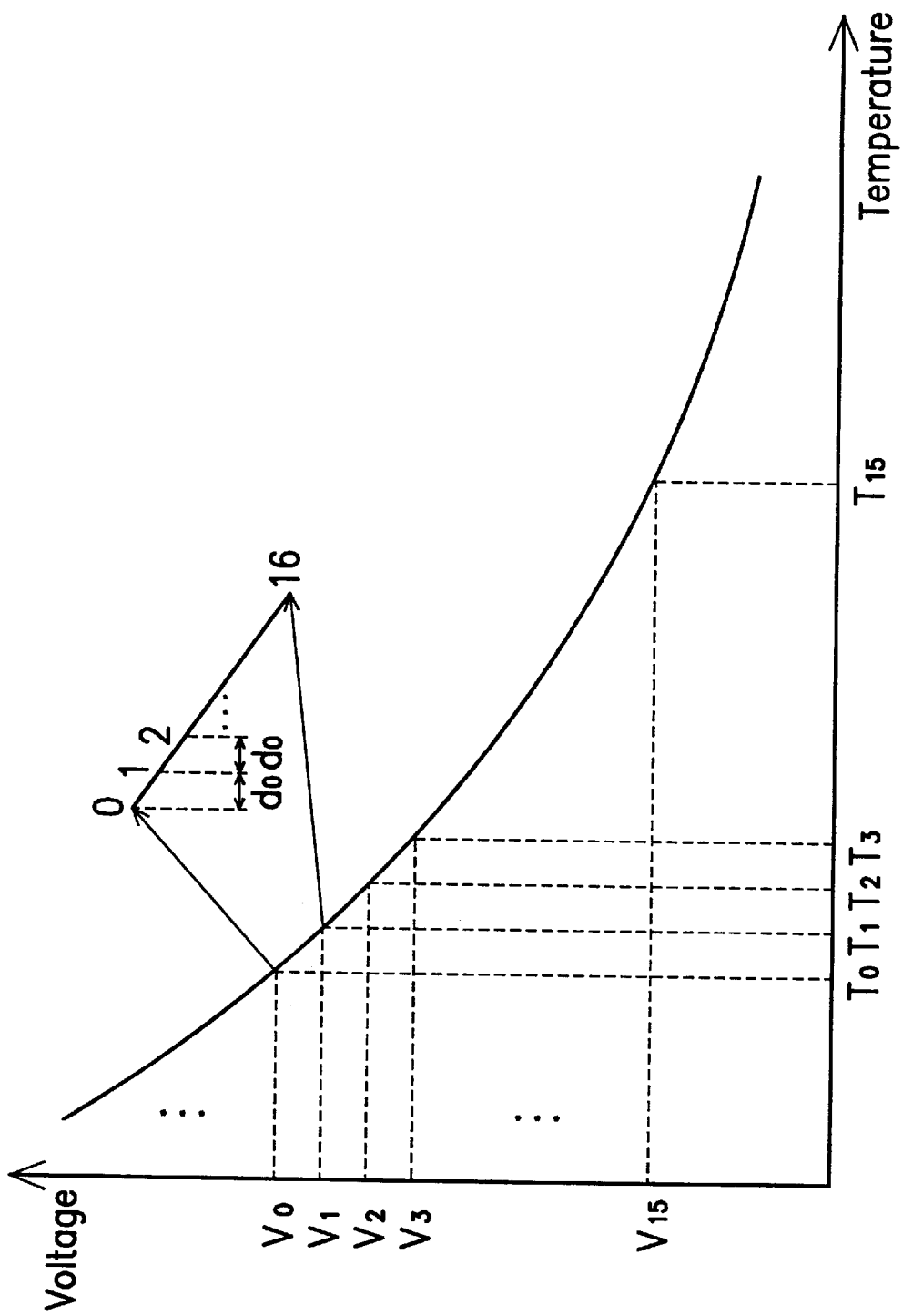
FIG. 2 shows the voltage(resistance)-temperature characteristic curve of a thermistor.

Referring to FIG. 2, the $T_0-T_1$ temperature segment is further divided into 16 equal partitions, and the value of every partition do serves as the temperature increment of $T_0-T_1$ temperature segment. Similarly, each of the other temperature segments, $T_1-T_2$, $T_2-T_3 \sim T_{14}-T_{15}$, is further divided into 16 equal partitions respectively, and the temperature increments $d_1$, $d_2 \sim d_{15}$ of the other temperature segments are obtained. The 8-bit temperature increments $d_0$, $d_1$, $d_2 \sim d_{15}$ are stored in a second storage device 13, thereby forming a temperature-increment table. The temperature increments $d_{15}$, $d_{14}$, $d_{13} \sim d_0$ correspond to the values (0h, 1h, 2h~Fh) of the higher bit portion AD<7:4> of the digital output.

As shown in FIG. 1, the higher bit portion AD<7:4> is decoded by a first multiplexer 14, and a rough temperature corresponding to the higher bit portion AD<7:4> is selected form the voltage-temperature cross-reference table. In the meantime, the higher bit portion AD<7:4> is decoded by a second multiplexer 15, and a temperature increment corresponding to the higher bit portion AD<7:4> is selected from the temperature-increment table and serves as a temperature step. The outputs of the first multiplexer 14 and the second multiplexer 15 are MRGH<7:0> (8-bit) and MINC<4:0> (5-bit) respectively. For instance, when the voltage of the thermistor Rt is between $V_0$ and $V_1$, the higher bit portion AD<7:4> of the analog-to-digital output is 15h. Therefore, the decoding result (rough temperature) MRGH<7:0> is $T_0$, and the corresponding temperature increment (temperature step) MINC<4:0> is $d_0$.

Next, the multiplier 16 multiplies the lower bit portion AD<3:0> of the analog-to-digital output by the temperature step MINC<4:0>, thereby obtaining a fine temperature MTVAL<8:0> (9-bit). For example, if the AD<3:0> is 2h, then the fine temperature is MTVAL<8:0> $2d_0$. To meet the requirement of precision, only the higher bit portion of the fine temperature MTVAL<8:0> needs to be taken into account, and therefore a bit selector 17 is used to choose the higher bit portion of the fine temperature MTVAL<8:0>, according to the specification of the precision. In this case, the higher 5 bits of the fine temperature MTVAL<8:0> are selected, and therefore the bit selector 17 outputs MTVAL<8:4>.

Finally, an adder 18 adds the truncated fine temperature MTVAL<8:4> to the rough temperature MRGH<7:0> and generates a practical temperature TRUEVAL<7:0>. In this case, the practical temperature TRUEVAL<7:0> equals $T_0+2d_0$.

In view of the above descriptions, the device according to the present invention utilizes a voltage-temperature cross-reference table and a temperature-increment table to reconstruct a piecewise voltage-temperature characteristic curve of the thermistor, thereby carrying out the voltage to temperature transformation. In this embodiment, 16 rough temperature values and 16 temperature increment values are stored respectively to form the voltage-temperature cross-reference table and the temperature-increment table, and a conversion precision of 256 levels can be achieved, wherein only 32 values are stored. However, the conventional voltage-temperature cross-reference table needs to store 256 temperature values to achieve the same conversion precision (256 levels). The memory required to store the values by the conventional conversion device is eight times of that required by the device in accordance with the present invention. Consequently, it is quite obvious that the present invention can reduce the amount of memory required to store the data of the voltage-temperature characteristic curve of a thermistor, and is very simple to implement, thereby reducing the fabrication cost.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A device for measure a practical temperature by converting a voltage to a temperature value comprising:

a thermistor and a division resistor connected in series, wherein one terminal of said thermistor is grounded, and one terminal of said division resistor is connected to a voltage source;

an analog-to-digital converter for converting the voltage of said thermistor into digital output;

a first storage device for storing a voltage-temperature cross-reference table;

a second storage device for storing a temperature-increment table;

a first multiplexer for decoding the higher bit portion of said digital output thereby selecting a corresponding temperature from said voltage-temperature cross-reference table as a rough temperature;

a second multiplexer for decoding the higher bit portion of said digital output thereby selecting a corresponding temperature increment from said temperature-increment table as a temperature step;

a multiplier for multiplying the lower bit portion of said digit output by said temperature step to obtain a fine temperature; and an adder for adding said fine temperature to said rough temperature to output a practical temperature value.

2. The device as claimed in claim 1, wherein a plurality of node voltages are selected to divide the voltage coordinates of the voltage-to-temperature curve of said thermistor into a plurality of voltage segments, and said node voltages have their corresponding node temperature values respectively, and said node temperature values are stored in said first storage device serving as said voltage-temperature cross-reference table.

3. The device as claimed in claim 2, wherein said node temperature values and the values of said higher bit portion are one to one mapped.

4. The device as claimed in claim 2, wherein the difference between every two adjoining node temperature values is divided by a specific number to obtain every temperature-increment value with respect to said two adjoining node temperature values, and said temperature-increment values are stored in said second storage device serving as said temperature-increment table.

5. The device as claimed in claim 1, wherein the values of the temperature increments stored in said temperature-increment table and the values of said higher bit portion are one to one mapped.

6. The device as claimed in claim 1, further comprising a bit selector which receives the output of said multiplier and outputs the higher bit portion of said fine temperature, according to the required precision, to said adder.

7. A device for measureing a practical temperature by converting a voltage to a temperature value comprising:

a thermistor and a division resistor connected in series, wherein one terminal of said thermistor is grounded, and one terminal of said division resistor is connected to a voltage source;

an analog-to-digital converter for converting the voltage of said thermistor into digital output;

a first storage device for storing a voltage-temperature cross-reference table;

a second storage device for storing a temperature-increment table;

a first multiplexer for decoding the higher bit portion of said digital output thereby selecting a corresponding temperature from said voltage-temperature cross-reference table as a rough temperature;

a second multiplexer for decoding the higher bit portion of said digital output thereby selecting a corresponding temperature increment from said temperature-increment table as a temperature step;

a multiplier for multiplying the lower bit portion of said digit output by said temperature step to obtain a fine temperature; and an adder for adding said fine temperature to said rough temperature to output a practical temperature value;

wherein a plurality of node voltages are selected to divide the voltage coordinates of the voltage-to-temperature curve of said thermistor into a plurality of voltage segments, and said node voltages have their corresponding node temperature values respectively, and said node temperature values are stored in said first storage device serving as said voltage-temperature cross-reference table.

8. The device as claimed in claim 7, wherein said node temperature values and the values of said higher bit portion are one to one mapped.

9. The device as claimed in claim 7, wherein the difference between every two adjoining node temperature values is divided by a specific number to obtain every temperature-increment value with respect to said two adjoining node temperature values, and said temperature-increment values are stored in said second storage device serving as said temperature-increment table.

10. The device as claimed in claim 7, wherein the values of the temperature increments stored in said temperature-increment table and the values of said higher bit portion are one to one mapped.

* * * * *